(12) United States Patent
Li et al.

(10) Patent No.: US 9,801,229 B2
(45) Date of Patent: Oct. 24, 2017

(54) METHOD FOR PROCESSING SERVICE CONNECTION IN A COMMUNICATION NETWORK AND DEVICE THEREOF

(75) Inventors: Xiangyang Li, PuDong Jinqiao Shanghai (CN); Yigang Cai, Naperville, IL (US)

(73) Assignees: Alcatel Lucent, Boulogne-Billancourt (FR); Alcatel Lucent USA Inc., Murray Hill, NJ (US)

( * ) Notice: Subject to any disclaimer, the term of this patent is extended or adjusted under 35 U.S.C. 154(b) by 738 days.

(21) Appl. No.: 13/993,704

(22) PCT Filed: Oct. 14, 2011

(86) PCT No.: PCT/IB2011/002834
§ 371 (c)(1),
(2), (4) Date: Jun. 13, 2013

(87) PCT Pub. No.: WO2012/080793
PCT Pub. Date: Jun. 21, 2012

(65) Prior Publication Data
US 2013/0260715 A1 Oct. 3, 2013

(30) Foreign Application Priority Data
Dec. 13, 2010 (CN) .......................... 2010 1 0601877

(51) Int. Cl.
*H04W 4/24* (2009.01)
*H04W 76/04* (2009.01)
(Continued)

(52) U.S. Cl.
CPC ............ *H04W 76/04* (2013.01); *G06Q 30/02* (2013.01); *H04L 12/1407* (2013.01);
(Continued)

(58) Field of Classification Search
CPC ...................................................... H04W 4/24
See application file for complete search history.

(56) References Cited

U.S. PATENT DOCUMENTS

| 7,886,343 | B2 * | 2/2011 | Sullivan | .................. H04L 12/14 |
| | | | | 713/153 |
| 8,463,232 | B2 * | 6/2013 | Tuli | ...................... H04M 15/00 |
| | | | | 455/405 |

(Continued)

FOREIGN PATENT DOCUMENTS

| CN | 101001463 A | 7/2007 |
| CN | 101296092 A | 10/2008 |

(Continued)

OTHER PUBLICATIONS

Supplementary European Search Report for corresponding European Application No. 11848218, dated Jun. 6, 2014, 3 pages.

(Continued)

*Primary Examiner* — Daniel Lai
*Assistant Examiner* — Frank Donado
(74) *Attorney, Agent, or Firm* — Fay Sharpe, LLP

(57) ABSTRACT

The present invention provides a method for processing a service connection in a communication network, comprising: A) determining, in response to a establishment request for the service connection from a UE, whether the service corresponding to the establishment request is a sponsored service, wherein the sponsored service is provided by a third party application provider; B) sending a validating request for the sponsored service to the third party application provider, if the service corresponding to the establishment request is a sponsored service; and C) controlling the sponsored service connection according to the information related to the sponsored service, if receiving a successful acknowledgement corresponding to the validating request. And a device corresponding to the method is provided. With (Continued)

the above method, the data connection of the sponsored application service may be dynamically controlled and configured, moreover the requirement of QoS control service can be dynamically met.

15 Claims, 5 Drawing Sheets

(51) Int. Cl.
    *H04L 12/14*     (2006.01)
    *G06Q 30/02*     (2012.01)
    *H04M 15/00*     (2006.01)

(52) U.S. Cl.
    CPC ........... *H04M 15/61* (2013.01); *H04M 15/66* (2013.01); *H04L 12/1417* (2013.01); *H04M 2215/0192* (2013.01)

(56) References Cited

U.S. PATENT DOCUMENTS

| | | | |
|---|---|---|---|
| 8,793,758 B2* | 7/2014 | Raleigh | ................... G06F 21/57 455/414.1 |
| 2009/0177650 A1 | 7/2009 | Petersson et al. | |
| 2009/0313665 A1 | 12/2009 | Rouse | |
| 2010/0009690 A1* | 1/2010 | Jin | .................... H04W 72/0406 455/450 |
| 2012/0195196 A1* | 8/2012 | Ghai | ..................... H04W 28/24 370/235 |
| 2013/0023230 A9* | 1/2013 | Momtahan | .............. H04L 12/14 455/405 |

FOREIGN PATENT DOCUMENTS

| | | |
|---|---|---|
| CN | 101296096 A | 10/2008 |
| CN | 101523861 A | 9/2009 |
| CN | 101719248 A | 6/2010 |
| WO | 2010/055402 | 5/2010 |

OTHER PUBLICATIONS

International Search Report for PCT/IB2011/002834 dated Mar. 29, 2012.

* cited by examiner

METHOD FOR PROCESSING SERVICE CONNECTION IN A COMMUNICATION NETWORK AND DEVICE THEREOF

TECHNICAL FIELD

The present invention relates to communication network, and particularly to a method and device for establishing, monitoring/controlling a service connection in a wireless communication network.

BACKGROUND

As 3GPP LTE mobile broadband technology is getting matured, it makes possible for end user to conveniently access/download applications via mobile handset anytime, anywhere and in any way. More and more application providers dig out this business opportunity, attract huge mobile end users via providing a lot of fancy applications. However, with LTE mobile broadband deployment, most network operators are also worrying about only becoming as network "bit pipe" providers, and are facing challenges how to earn money from the application service.

The new emerging sponsored data connection business model occurs between network operator and third party application provider. In such new business model, the sponsored application service provider will own the users, who will pay, for the service in their use, the application store provider (such as Google, Apple AppStore, Yahoo, Facebook, . . . ), instead of paying directly, for the service in their use, the mobile operator. The sponsored application service provider will have further revenue sharing with the network providers to guarantee the quality of service (QoS) of its application via mobile operator's broadband network.

Currently, mobile operators have the ability of 3GPP policy and charging control (PCC) and deep packet inspection (DPI) technology to assist operator in controlling and managing the network bandwidth to make full use of and monetize the resource in the their network. However, the current 3GPP architecture cannot well adapt for the new emerging sponsored business model between mobile operators and third party application store (AppStore) providers. The 3GPP PCC architecture only provides the solution for operator to control its own subscriber's data service connection, but does not propose how to have policy and charging control for the end user owned by the third party application providers, since the third party end user pays for the network connectivity which is separate from the subscriber's online charging in the PCC architecture.

Thus, in a sponsored application connection service model, there is short of a solution enabling the operator dynamically control/configure data connection of the sponsored application service during the existence of the connection, according to traffic flow of data connection of the service.

SUMMARY OF THE INVENTION

In view of the drawback existing in the prior art, the present invention provides a method and device for establishing and maintaining the connection of sponsored service in the communication network, thereby solving the inability of dynamic metering of traffic flow for the service of the UE in the data bearing network of the prior art, and in correspondence to requirement of traffic flow of the service connection, dynamically controlling, configuring the data connection of the sponsored application service to dynamically meet the demands of QoS control service in combination with the usage limit for the service of UE, thus enhancing the performance of current 3GPP PCC architecture so as to enable policy and charging control for the sponsored data service or application in the operator' network.

According to one embodiment of the present invention, there is provided a method for processing a service connection in a communication network, comprising: A) determining, in response to an establishment request for the service connection from a UE, whether the service corresponding to the establishment request is a sponsored service, wherein the sponsored service is provided by a third party application provider; B) sending a validating request for a sponsored service to the third party application provider, if the service corresponding to the establishment request is the sponsored service; and C) controlling the sponsored service connection according to the information related to the sponsored service, if receiving a successful acknowledgement corresponding to the validating request; wherein the related information is acquired from the third party application provider.

Optionally, the implementation of the method may be deployed in the subscriber profile repository (SPR) of the communication network.

Correspondingly, according to another one embodiment of the present invention, there is provided a method of providing service usage information of a UE in a service management and usage control system of a communication network, comprising the steps of: receiving usage report of a third party service on the UE; b) judging, according to the report, whether the usage limit of the third party service for the UE is exceeded; c) sending a limit exceeding report, if the usage limit of the service is exceeded.

According to another one embodiment of the present invention, there is provided a device for processing a service connection communication network, comprising: a connection determining module for determining, in response to a establishment request for the service connection from a UE, whether the service corresponding to the establishment request is a sponsored service, wherein the sponsored service is provided by a third party application provider; a validating request sending module for sending a validating request for the sponsored service to the third party application provider, if the service corresponding to the establishment request is a sponsored service; and a connection establishing module for controlling the sponsored service connection according to the information related to the sponsored service, if receiving a successful acknowledgement corresponding to the validating request; wherein the related information is acquired from the third party application provider.

Accordingly, according to still another one embodiment of the present invention, there is provided a device for providing service usage information of a UE in a service management and usage control system of a communication network, comprising: a service report receiving module for receiving usage report of the service on the UE/end user; a limit judging module for judging, according to the report, whether the usage limit of the service for the UE/end user is exceeded; a limit exceeding report sending module for sending a limit exceeding report, if the usage limit of the service for the UE/end user is exceeded.

In the solution of embodiment(s) of the present invention, it is SPR that interfaces with the sponsored application service provider, to acquire the runtime information of sponsored service connection, for example, QoS information. Being well compatible with the charging architecture of the existing 3GPP standard, there is no need of improvements for the interfaces of Gx and Gy. The solution of the embodiment(s) renders application layer transparent to the network bearing layer, thereby enabling the network bearing layer to acquire, in real time mode, the usage status, usage/spending limit of the sponsored service connection and QoS related information etc., thus resulting in a more precise charging. Moreover, the network bearing layer does not need to adapt particularly for the sponsored service connection.

Furthermore, for the requirement of data traffic flow of the sponsored service connection, policy and rule of such as charging are dynamically generated, thereby enabling a dynamical control, configuration of the data connection of the sponsored application service, thus dynamically meeting the requirement of QoS control service.

Additionally, in one embodiment of the present invention, with the utilization of position of SPR in the PCC architecture, data service is connected between a first UE and a second UE and the sponsored service is controlled in run-time mode, thereby making full use of the existing architecture of PCC, minimizing the amendments to the system. Moreover, SPR further queries the usage control and charging system of third party application provider to verify the validation of end user, the sponsored service connection to which the UE requests the attachment and the data usage relative thereto. On the basis of an authorized data usage, in some embodiment (s) of the present invention, policy and charging control rule is generated according to the information about such sponsored service connection, moreover, generally, the embodiment of the present invention corresponds to basic 3GPP PCC architecture and principle.

In one embodiment of the present invention, charging data record may be generated, thereby facilitating offline charging settlement among relevant parties.

BRIEF DESCRIPTION OF THE DRAWINGS

Other features, aspects and advantages of the present invention will become more apparent by reading the following description of non-limiting embodiments with the aid of appended drawings.

wherein, same or similar reference numerals refer to the same or similar device(module) or step of method.

DETAILED DESCRIPTION OF EMBODIMENTS

Figure 1:
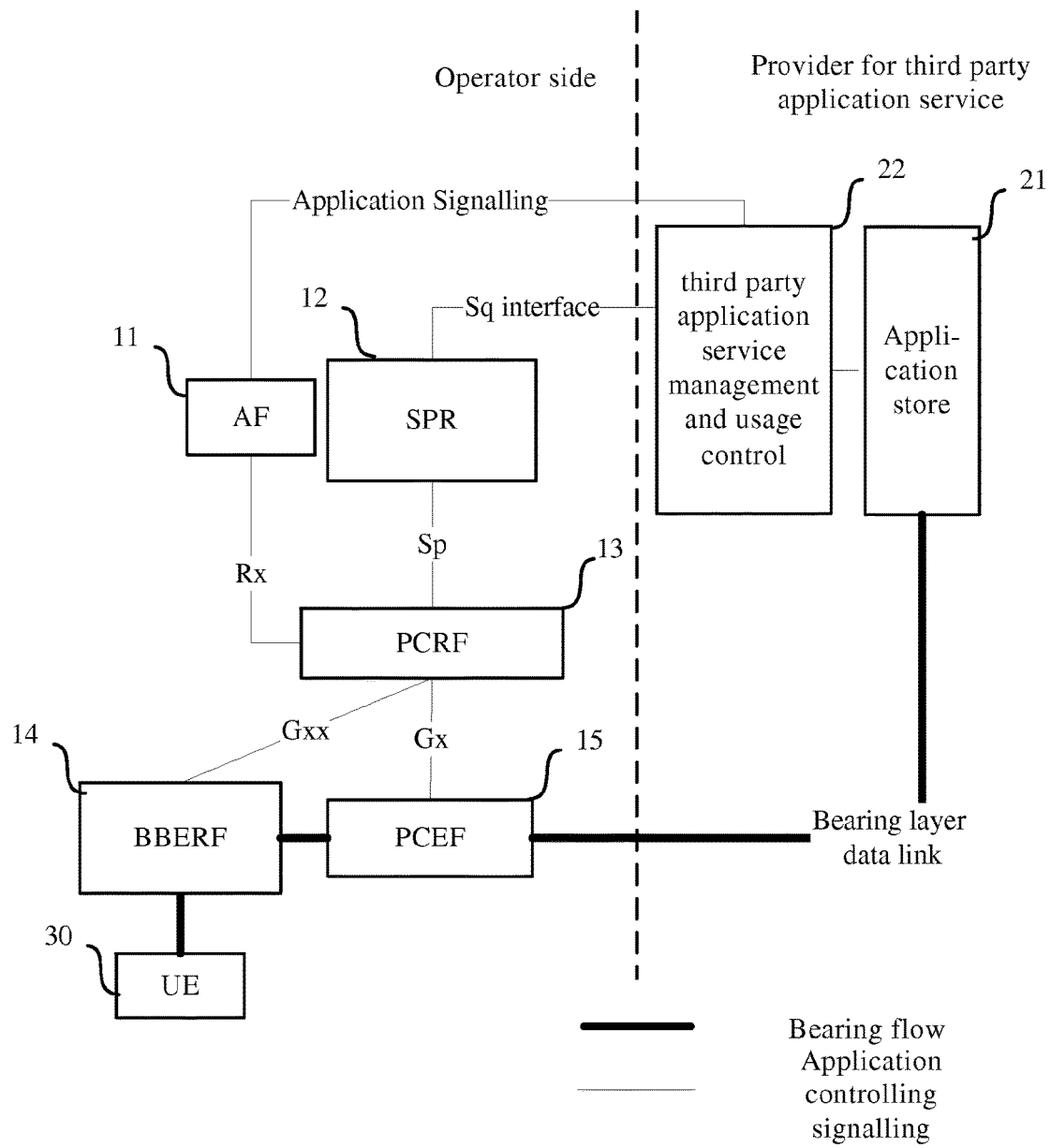
FIG. 1 illustrates a system topology of a communication network according to one embodiment of the present invention.

FIG. 1 illustrates a system topology of a communication network according to one embodiment of the present invention. In the communication network as shown in FIG. 1, on the side of operator, there are SPR 12, Application Function (AF) module 11, Policy and Charging Rules Function (PCRF) module 13, Bearing Binding and Event Report Function(BBERF) module 14, Policy and Charging Enforcement Function (PCEF) module 15. On the side of sponsored application service provider, there are sponsored service management and usage control system 22 and application store 21. UE 30 accesses the network via the above BBERF module 14 and PCEF module 15. The UE 30 may initiate service connection request, and the service may be provided by application store 21.

Wherein, there is a signaling of application layer between Application Function module 11 and sponsored service management and usage control system 22, while data bearing layer resides substantially between PCEF module 15 and application store 21.

Figure 2:
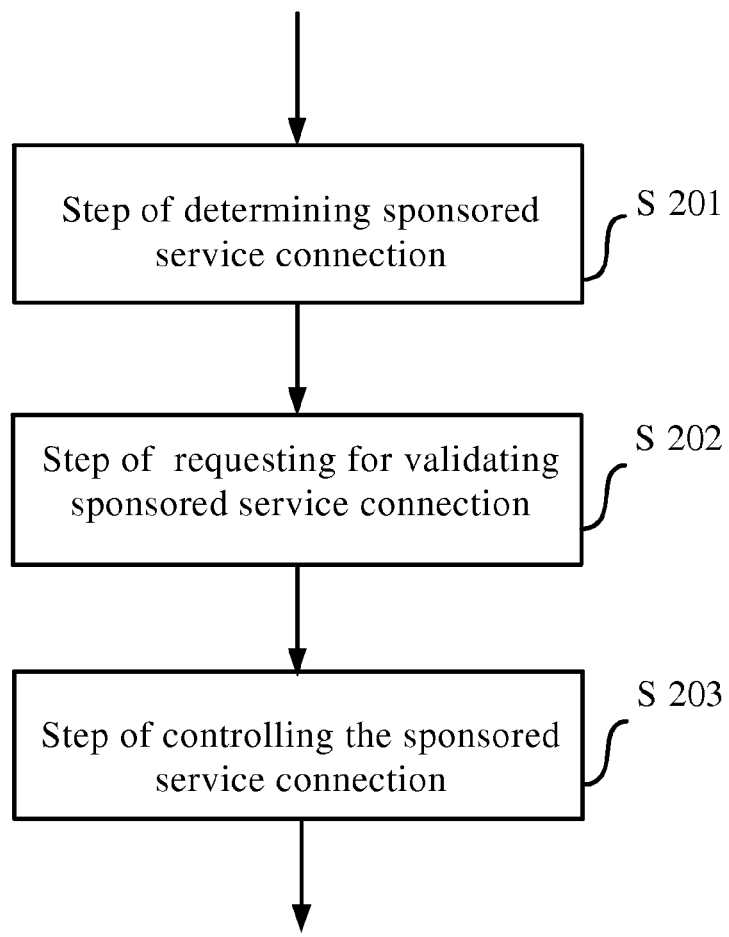
FIG. 2 illustrates a flow chart of method for processing service connection in the communication network according to one embodiment of the present invention.

FIG. 2 illustrates a flow chart of method for processing service connection in the communication network according to one embodiment of the present invention. As shown in the Figure, the method comprises three steps: step S201 of determining sponsored service connection, step S202 of validating request for sponsored service connection, step S203 of establishing sponsored service connection.

Figure 3:
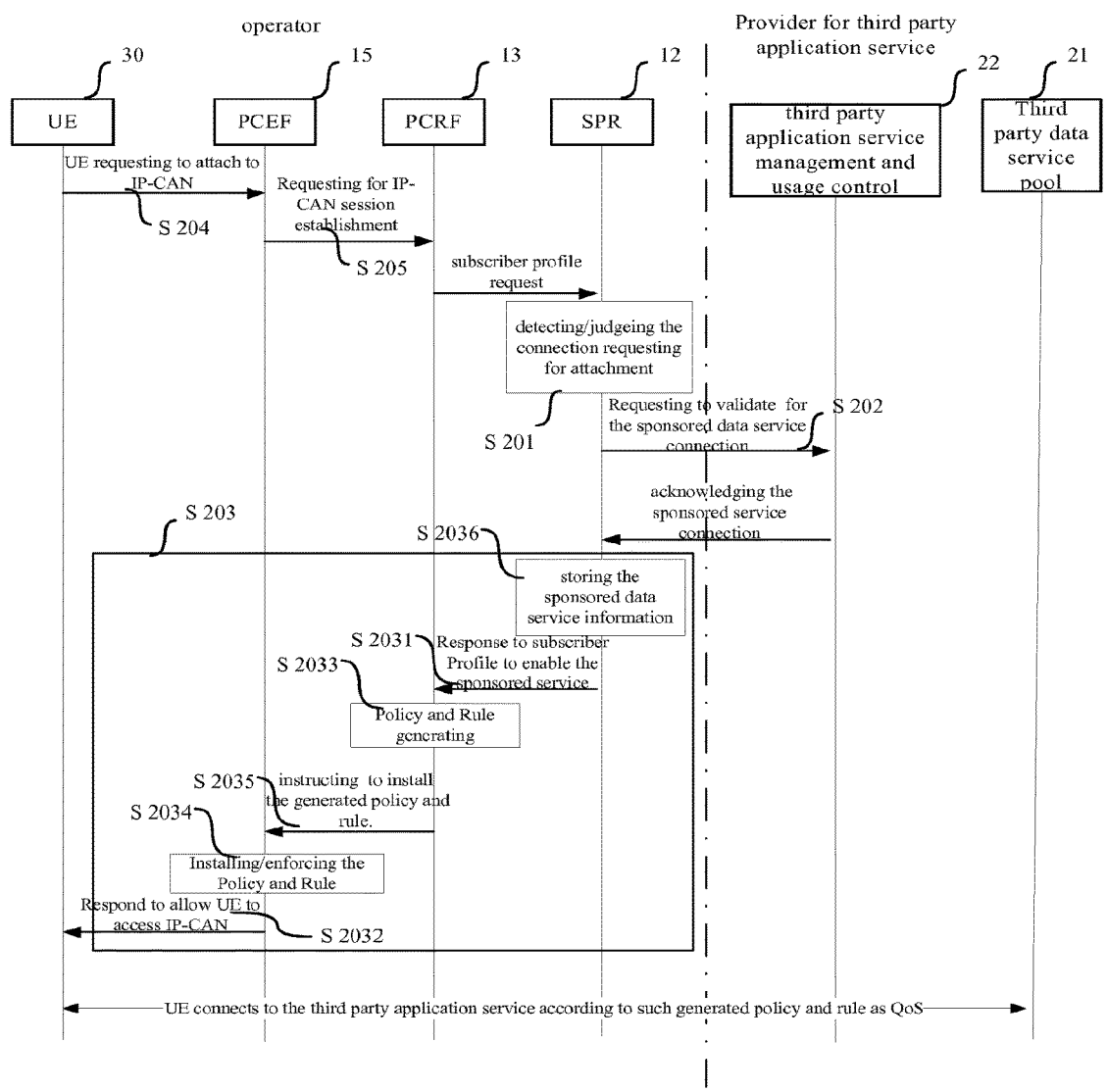
FIG. 3 illustrates a flow chart of scenario for processing service connection on the occasion of access of a sponsored application service in the communication network according to one embodiment of the present invention.

FIG. 3 illustrates a flow chart of scenario for processing service connection on the occasion of access of a sponsored application service in the communication network according to one embodiment of the present invention. There show the process and operation logical relationship among several network modules, as they perform the method of embodiment(s) of the present invention, in the communication network as shown in FIG. 1.

Assuming that UE 30 initiates, at a given time, an access to PCEF module 15 for some sponsored service.

Correspondingly, in step S201, it may be determined, in response to a establishment request for the service connection from UE 30, whether the service corresponding to the establishment request is a sponsored service, wherein a third party application provider, for example the application store 21 shown in FIG. 1, provides UE 30 with such sponsored service.

Then, in step S202, if the service corresponding to the establishment request is a sponsored service, sending a validating request for the sponsored service to the third party application provider, for example sponsored service management and usage control system 22 and/or application store 21.

As shown in FIG. 3, optionally, SPR 12 may perform, as an performing subject, step S201 and step S202.

Subsequently, in step S203, on the occasion of receiving a successful acknowledgement corresponding to the validating request, sponsored service connection process may be controlled according to the information related to the sponsored service; wherein the related information is acquired from the third party application provider, for example sponsored service management and usage control system 22 and/or application store 21.

Optionally, the implementation of the above steps S201 and S202 may be deployed within SPR 12 of the communication network. As shown in FIG. 1, the steps of the method may be carried out by introducing a Sq interface between SPR 12 and sponsored service management and usage control system 22 in the communication architecture.

Hereinafter, further description will be made for the present invention in combination with FIG. 1, FIG. 2 and FIG. 3.

Optionally, as shown in FIG. 3, step S203 may comprise two sub-step S2031 and S2032.

In step S2031, a response may be made, according to the related information, to a subscriber profile request of the UE 30 to enable the establishment of the sponsored service connection, wherein, optionally, SPR 12 in the communication network is allowable to be a performing subject for the step S2031 which otherwise may be deployed within other feasible network element.

In step S2032, responding to the establishment request of the sponsored service connection to accept the attachment to IP-CAN(IP Connection Access Network) by the UE 30. Optionally, Policy and Charging Enforcement Function module 15 in the communication network is allowable to be a performing subject for such step S2032 which otherwise may be deployed within other feasible network element.

As shown in FIG. 3, optionally, step S203 may further comprise two sub-step S2033 and S2034.

In step S2033, policy rule for controlling the sponsored service connection may be generated according to the related information of sponsored service connection. Optionally, Policy and Charging Rules Function(PCRF) module 13 in the communication network is allowable to be a performing subject for such step S2033 which otherwise may be deployed within other feasible network element.

In step S2034, the sponsored service connection may be controlled according to the policy rule. Optionally, Policy and Charging Enforcement Function module 15 in the communication network is allowable to be a performing subject for such step S2034 which otherwise may be deployed within other feasible network element.

Certainly, prior to step S2034, there may be included a step S2035, in such a step, the generated policy rule may be installed by Policy and Charging Enforcement Function module 15, under the instruction of Policy and Charging Enforcement Function module 15 in the communication network.

Optionally, the method in such embodiment may further comprise step S2036 prior to step S2031, and in such step, it may be the SPR 12 that stores the related information of the sponsored service connection.

Optionally, prior to step S201, there may be included step S204 and step S205.

In step S204, in response to an attachment to an IP connectivity access network of the communication network by the UE 30, generating message of policy and Charging Control request for the IP-connection Access. Optionally, Policy and Charging Enforcement Function module 15 in the communication network is allowable to be a performing subject for such step 204, Policy and Charging Enforcement Function module 15 sends the request to Policy and Charging Rules Function module in the communication network, after generating the above establishment request.

In step S205, optionally, it may be Policy and Charging Rules Function module 13 that query the subscriber profile of the UE according to the Policy and Charging Control request of the IP connection access from the Policy and Charging Enforcement Function module 15.

Optionally, for the method of above embodiment(s), there still may include the step of generating corresponding charging data record for sponsored service connection. And the generated charging data record may be applicable to offline settlement of the charging generated for corresponding sponsored service connection between the relevant parties, for example the operator and sponsored application service provider 21.

For the relevant information involved in the above embodiment, optionally, there may include the usage allowance and spending limit corresponding to the UE 30.

After step S203, UE 30 may access sponsored application service according to policy rule such as the generated QoS.

Figure 4:
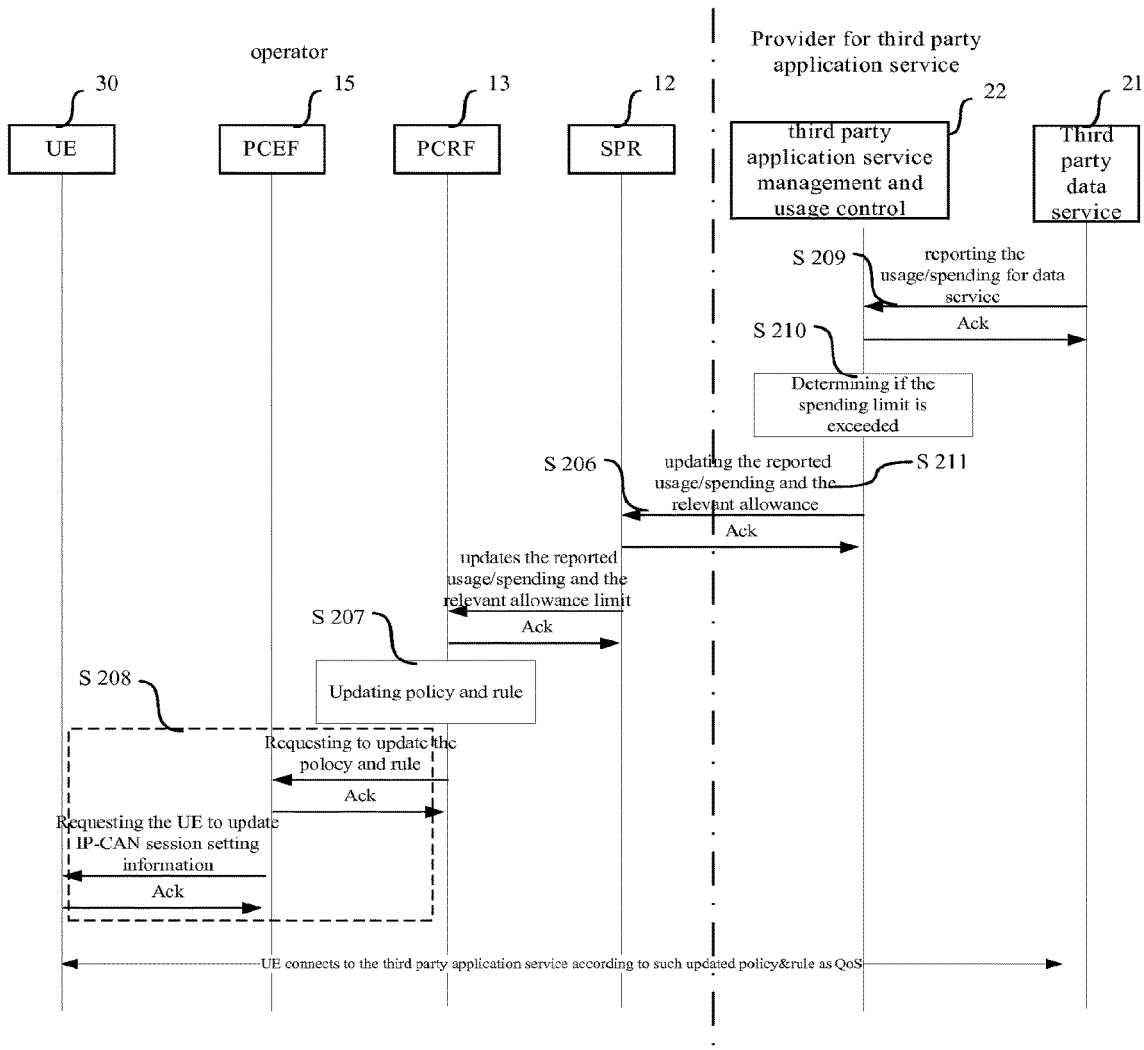
FIG. 4 illustrates a flow chart of scenario for processing service connection on the occasion that rule policy is updated in the communication network according to one embodiment of the present invention.

FIG. 4 illustrates a flow chart of scenario for processing service connection on the occasion that the rule policy is updated in the communication network according to one embodiment of the present invention. As shown in the figure, the communication network on operator's side may dynamically update some related information involved in such service according to the active report/request from sponsored service provider, for example sponsored service management and usage control system 22.

As shown in FIG. 4, the method in the above embodiment may further comprise step S206, S207 and S208.

In step S206, reporting information is received from the third party application provider, for example sponsored service management and usage control module 22, optionally, SPR 12 is allowable to be a performing subject for such step.

In step S207, policy rule is updated according to the reporting information received in step S206. Optionally, Policy and Charging Rules Function module 13 is allowable to be a performing subject for such step.

In step S208, sponsored service connection is controlled according to the updated policy rule in step S207. As shown in FIG. 4, in step S208, Policy and Charging Rules Function module 13 may request Policy and Charging Enforcement Function module 15 to update policy rule, then, Policy and Charging Enforcement Function module 15 request UE 30 to update session setting information of the IP-CAN.

After completion of a new session setting for the corresponding service according to the updated policy rule, the UE 30 accesses the sponsored application service according to the updated policy rule such as QoS and so on.

According to another embodiment of the present invention, correspondingly, there is provided a method of providing service usage information of UE 30 in service management and usage control system 22 of communication network, the method comprises step S209, S210 and S211.

In step S209, sponsored service management and usage control system 22 receives the usage report for the sponsored service.

In step S210, a judgment is made, according to the report, about whether the usage limit of the sponsored service for the UE/end user 30 is exceeded.

In step S211, sponsored service management and usage control system 22 sends a limit exceeding report to SPR 12 in communication network if the usage limit of the service for the UE/end user 30 is exceeded.

Optionally, the report information in the above embodiment comprises current usage information and usage allowance information corresponding to the UE 30.

Figure 5:
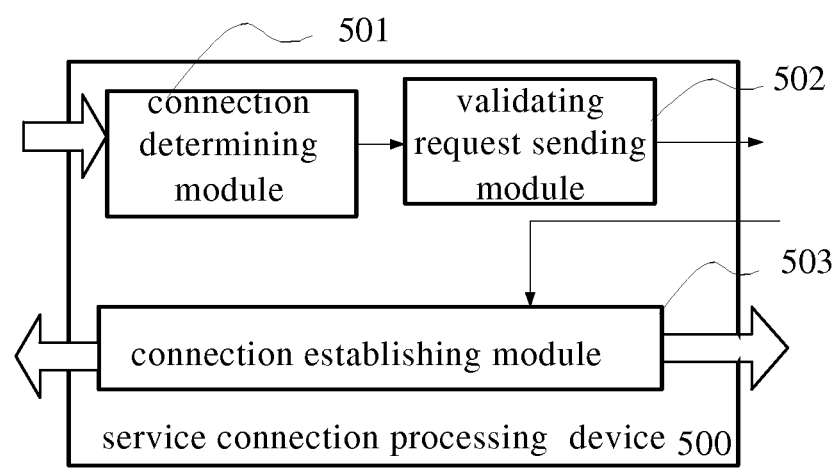
FIG. 5 illustrates a structural block diagram of a device for processing the service connection according to one embodiment of the present invention.

FIG. 5 illustrates a structural block diagram of a device for processing the service connection according to one embodiment of the present invention. The device 500 for processing service connection comprises a connection determining module 501, a validating request sending module 502, and a connection establishing module 503.

Wherein, the connection determining module 501 is configured to determine, in response to a establishment request for the service connection from UE 30, whether the service corresponding to the establishment request is a sponsored service, wherein such sponsored service is provided by a third party application provider, for example the sponsored service management and usage control system 22 and/or third party data service store 21.

The validating request sending module 502 is configured to send, a validating request for the sponsored service, to the third party application provider, for example the service management and usage control system 22, if the service corresponding to the establishment request is a sponsored service.

The connection establishing module 503 is configured to control the sponsored service connection according to the information related to the sponsored service on the occasion of receiving a successful acknowledgement corresponding to the validating request; wherein the related information is acquired from the third party application provider, for example sponsored service management and usage control system 22 and/or sponsored data service store 21.

Optionally, the above three modules may be deployed within SPR 12 of the communication network. Differentiation/distribution of the network elements for deployment neither affects the integrity of functionality of device 500, nor constitute limitation to the present invention.

Optionally, the connection establishing module 503 further comprises connection enabling module and connection accepting module.

The connection enabling module is configured to respond, according to the related information, to a request for the subscriber profile of the UE so as to enable the establishment of the sponsored service connection;

The connection accepting module is configured to respond to the establishment request of the sponsored service connection so as to accept the attachment to IP-CAN by the UE.

Optionally, the connection establishing module 503 further comprises a policy generating module and a connection controlling module.

The policy generating module is configured to generate policy rule for controlling the sponsored service connection according to the related information of the sponsored service connection;

The connection controlling module is configured to control process of the sponsored service connection according to the policy rule generated by the policy generating module.

Optionally, the above related information comprises the usage allowance and spending limit corresponding to UE 30.

Optionally, the device 500 for processing service connection may further comprise report receiving module, policy updating module, connection updating control module, which are used by the sponsored service.

The report receiving module used by sponsored service, is configured to receive reporting information for service usage from the third party application provider, for example, service management and usage control system 22. Optionally, the report receiving module may be deployed in the SPR 12 in the communication network.

The policy updating module is configured to update dynamically the policy rule according to the above reporting information received by the report receiving module. Optionally, the policy updating module may be deployed in the policy and charging rules function 13 in the communication network.

The connection updating control module is configured to control the process/procedure of the sponsored service connection according to the updated policy rule which is updated by the policy updating module. Optionally, the connection updating control module may be deployed in Policy and Charging Enforcement Function module 15 in the communication network.

According to another embodiment of the present invention, there is also provided a device for providing service usage information of a UE 30 in a service management and usage control system 22 of a communication network. The device comprises: a service report receiving module, a limit judging module, a limit exceeding report sending module.

Wherein, the service report receiving module is configured to receive usage report of the service on the UE 30.

Limit judging module is configured to judge, according to the above usage report, whether the usage limit of the corresponding sponsored service on the UE 30 is exceeded.

Limit exceeding report sending module is configured to send a limit exceeding report, for example to the SPR 12 in the communication network, if the usage limit of the sponsored service connection on the UE is exceeded.

Optionally, the above reporting information comprises current usage information and usage allowance information corresponding to the UE 30.

Those skilled in the art could readily appreciate, the device in the present invention can be implemented by means of either hardware module, functional module of software, or the hardware module with functional module of software incorporated therein.

Those skilled in the art could readily appreciate, the above embodiment are intended to be exemplary but not limited thereto. Different technical features in various embodiments can be combined, so as to gain some technical effect. After studying the accompanying figures, specification and claims, those skilled in the art should readily appreciate and carry out some variation for the above disclosed embodiments. In the claims, the term of "comprise" does not exclude the existence of other device (s) or step(s); indefinite article "a/an" does not exclude the "multiple" case; term of "a first", "a second" is just used for identifying a name rather than for representing some particular order. Reference signs in the claims, if any, should not be construed to be any restriction to protection scope. Multiple component functionalities in the claim(s) may be implemented by means of a singular hardware or software. The occurrence of some technical features in different dependent claims does not eliminate the possibility of the technical effect resulting from the combination of these technical features.

What is claimed is:

1. A method for processing a service connection in a communication network, comprising:
    determining, by a subscriber profile repository (SPR) located between a Policy and Charging Rules Function (PCRF) and a third party application provider, in response to an establishment request for said service connection from a UE, whether the service corresponding to said establishment request is a sponsored service, wherein
    said sponsored service is provided by said third party application provider;
    sending, by said SPR, a validating request for said sponsored service to said third party application provider when the service corresponding to said connection establishment request is a sponsored service; and
    at least one of said SPR, PCRF or a Policy and Charging Enforcement Function (PCEF) controlling said sponsored service connection according to information related to said sponsored service and acquired from said third party application provider when said SPR receives a successful acknowledgement corresponding to said validating request from said third party application provider.

2. The method according to claim 1, wherein said controlling said sponsored service connection according to the information related to said sponsored service, if receiving a successful acknowledgement corresponding to said validating request comprises:

responding, according to said related information, to a subscription profile request of said UE to enable the establishment of said sponsored service connection;

responding to said establishment request of said sponsored service connection to accept an attachment to IP-CAN by said UE.

3. The method according to claim 1, wherein said controlling said sponsored service connection according to the information related to said sponsored service, if receiving a successful acknowledgement corresponding to said validating request further comprises:

generating policy rule for controlling said sponsored service connection according to said related information of said sponsored service connection;

controlling said sponsored service connection according to said policy rule.

4. The method according to claim 1, wherein, prior to said determining, in response to an establishment request for said service connection from a UE, whether the service corresponding to said establishment request is a sponsored service, the method further comprises:

in response to an attachment to an IP-connection access network of said communication network by said UE, generating policy and charging control request for the corresponding IP-connection access;

querying subscriber profile of said UE, according to the policy and charging control request for said IP connection access.

5. The method according to claim 1, wherein said controlling said sponsored service connection according to the information related to said sponsored service, if receiving a successful acknowledgement corresponding to said validating request further comprises:

storing said related information of said sponsored service connection.

6. The method according to claim 1, wherein said related information comprises usage allowance and spending limit corresponding to said UE.

7. The method according to claim 3, wherein, said method further comprises:

generating corresponding charging data record for said sponsored service connection.

8. The method according to claim 3, wherein, after said controlling said sponsored service connection according to said policy rule, said method further comprises:

subscriber profile repository receiving reporting information from said third party application provider;

updating said policy rule according to said reporting information; and controlling said sponsored service connection according to said updated policy rule.

9. The method according to claim 8, wherein, said reporting information comprises current usage information and usage allowance information corresponding to said UE.

10. A method of providing service usage information of a User Equipment (UE) in a service management and usage control system of a communication network, comprising:

receiving a usage report of the service on said UE;

judging, according to said report, whether a usage limit of the service for said UE is exceeded;

sending a limit exceeding report to a subscriber profile repository (SPR) located between a Policy and Charging Rules Function (PCRF) and a third party application provider in the communication network when the usage limit of the service for said UE is exceeded, said SPR, PCRF or a Policy and Charging Enforcement Function (PCEF) controlling a sponsored service connection, which is sponsored by said third party application provider, when receiving a successful acknowledgement from said third party application provider corresponding to a validation request sent to said third party application provider by SPR when the service is a sponsored service.

11. A device for processing a service connection in a communication network, comprising:

a connection determining module for determining, by a subscriber profile repository (SPR) located between a Policy and Charging Rules Function (PCRF) and a third party application provider, in response to an establishment request for said service connection from a UE, whether the service corresponding to said establishment request is a sponsored service, wherein said sponsored service is provided by said third party application provider;

a validating request sending module for sending, by said SPR, a validating request for said sponsored service to said third party application provider when the service corresponding to said connection establishment request is a sponsored service; and a connection establishing module for controlling said sponsored service connection according to information related to said sponsored service and acquired from said third party application provider when said SPR receives a successful acknowledgement corresponding to said validating request from said third party application provider.

12. The device according to claim 11, wherein said connection establishing module further comprises:

a connection enabling module for responding, according to said related information, to a subscriber profile request of said UE to enable the establishment of said sponsored service connection;

a connection accepting module for responding to said establishment request of said sponsored service connection to accept an attachment to IP-CAN by said UE.

13. The device according to claim 11, wherein, said connection establishing module further comprises:

a policy generating module for generating policy rule for controlling said sponsored service connection according to said related information of said sponsored service connection;

a connection controlling module for controlling said sponsored service connection according to said policy rule.

14. The device according to claim 13, further comprising:

a report receiving module, for receiving reporting information from said third party application provider;

a policy updating module, for updating said policy rule according to said reporting information; and a connection updating control module, for controlling said sponsored service connection according to said updated policy rule.

15. A device for providing service usage information of a User Equipment (UE) in a service management and usage control system of a communication network, comprising:

a service report receiving module for receiving a usage report of the service on said UE;

a limit judging module for judging, according to said report, whether a usage limit of the service for said UE is exceeded;

a limit exceeding report sending module for sending a limit exceeding report to a subscriber profile repository (SPR) located between a Policy and Charging Rules Function (PCRF) and a third party application provider in the communication network when the usage limit of the service for said UE is exceeded, said SPR, PCRF or a Policy and Charging Enforcement Function (PCEF) controlling a sponsored service connection, which is sponsored by said third party application provider, when receiving a successful acknowledgement from said third party application provider corresponding to a validation request sent to said third party application provider by SPR when the service is a sponsored service.

* * * * *